(12) United States Patent
Abedini et al.

(10) Patent No.: US 10,977,755 B2
(45) Date of Patent: Apr. 13, 2021

(54) COGNITIVE SCREENING FOR PROHIBITED ITEMS ACROSS MULTIPLE CHECKPOINTS BY USING CONTEXT AWARE SPATIO-TEMPORAL ANALYSIS

(71) Applicant: International Business Machines Corporation, Armonk, NY (US)

(72) Inventors: Mani Abedini, Melbourne (AU); Rajib Chakravorty, Melbourne (AU); Rahil Garnavi, Melbourne (AU); Zongyuan Ge, Melbourne (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 239 days.

(21) Appl. No.: 15/819,730

(22) Filed: Nov. 21, 2017

(65) Prior Publication Data
US 2019/0156449 A1    May 23, 2019

(51) Int. Cl.
*G06K 9/00* (2006.01)
*G06Q 50/26* (2012.01)

(52) U.S. Cl.
CPC ....... *G06Q 50/265* (2013.01); *G06K 9/00771* (2013.01)

(58) Field of Classification Search
None
See application file for complete search history.

(56) References Cited

U.S. PATENT DOCUMENTS

| | | | |
|---|---|---|---|
| 7,629,885 B2 | 12/2009 | Dugan et al. | |
| 8,903,128 B2 | 12/2014 | Shet et al. | |
| 10,176,388 B1 * | 1/2019 | Ghafarianzadeh | G06K 9/00671 |
| 10,304,191 B1 * | 5/2019 | Mousavian | G06T 7/70 |
| 2004/0252024 A1 * | 12/2004 | Huey | G01V 5/0008 340/540 |
| 2005/0230604 A1 * | 10/2005 | Rowe | G01S 13/887 250/221 |
| 2005/0248450 A1 * | 11/2005 | Zanovitch | G08B 25/085 340/506 |
| 2007/0195994 A1 | 8/2007 | McClelland et al. | |
| 2008/0152082 A1 | 6/2008 | Bouchard et al. | |

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — Sean M Conner
(74) *Attorney, Agent, or Firm* — Joseph Petrokaitis, Esq.; McGinn IP Law Group, PLLC

(57) ABSTRACT

A computer-implemented screening method, system, and computer program product including detecting at least two disassembled components of an object spread across multiple sensor scan images of at least one container, storing a record of each disassembled component correlated with contextual information of each owner of each container corresponding to a sensor scan image, and flagging the owner of the container in the sensor scan image based on a joint assessment of the sensor scan image including a disassembled component that can be combined with another disassembled component in a different sensor scan image to assemble the object and the contextual information of each owner.

10 Claims, 6 Drawing Sheets

(56) References Cited

U.S. PATENT DOCUMENTS

| | | | |
|---|---|---|---|
| 2016/0335449 A1 | 11/2016 | Adams et al. | |
| 2017/0243067 A1* | 8/2017 | Bulan | G06K 9/00771 |
| 2017/0316285 A1* | 11/2017 | Ahmed | G06K 9/66 |
| 2018/0129906 A1* | 5/2018 | Habibian | G06K 9/4628 |
| 2018/0239968 A1* | 8/2018 | Gupta | G06K 9/00637 |
| 2018/0341872 A1* | 11/2018 | Wang | G06N 3/0454 |
| 2019/0019318 A1* | 1/2019 | Cinnamon | G06T 1/0007 |
| 2019/0355147 A1* | 11/2019 | Li | G06K 9/4604 |

OTHER PUBLICATIONS

Anonymous "Method and system for airport baggage security checking and holographic object Navigation" IBM Confidential, ip.com No. IPCOM000246751D, Jun. 29, 2016.

\* cited by examiner

FIG. 3
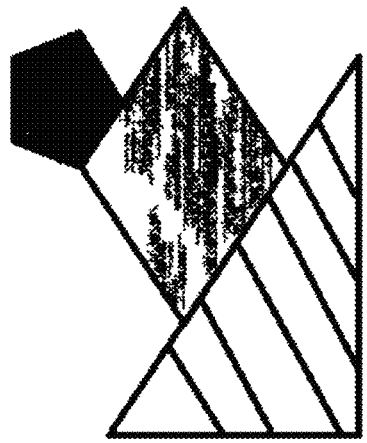
OBJECT 301
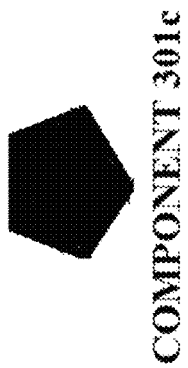
COMPONENT 301c
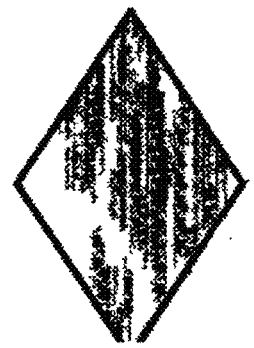
COMPONENT 301b
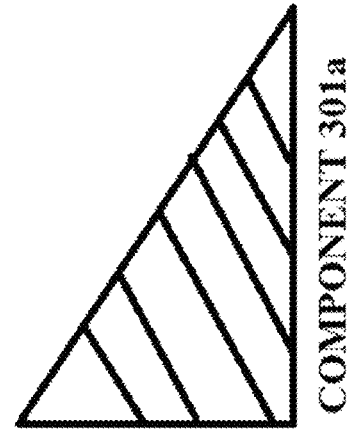
COMPONENT 301a

COGNITIVE SCREENING FOR PROHIBITED ITEMS ACROSS MULTIPLE CHECKPOINTS BY USING CONTEXT AWARE SPATIO-TEMPORAL ANALYSIS

BACKGROUND

The present invention relates generally to a screening (e.g., luggage, passenger, etc.) method, and more particularly, but not by way of limitation, to a cognitive method, a computer program product, and a system for a spatial and temporal analysis based on disassembled or disjoint components of a flagged object (e.g., an assembly) in a security screen.

Luggage and identity checking, such those that are used by airport authorities for checking luggage, are increasingly important in the fight against international terrorism and in preventing potential danger. Conventionally, sophisticated hiding methods being used such as disassembling the dangerous items/weapons into multiple small pieces poses a greater risk and makes the security system very difficult to select and recognize them. Thus, there is a need in the art for a screening system that can check for disassembled components of an object across potentially multiple screen check points (e.g., spatially and/or temporally different).

SUMMARY

In an exemplary embodiment, the present invention provides a computer-implemented screening method, the method including detecting at least two disassembled components of an object spread across multiple sensor scan images of a container, storing a record of each disassembled component correlated with contextual information of each owner of each container corresponding to a sensor scan image, and flagging the owner of the container in the sensor scan image based on a joint assessment of the sensor scan image including a disassembled component that can be combined with another disassembled component in a different sensor scan image to assemble the object and the contextual information of each owner.

One or more other exemplary embodiments include a computer program product and a system.

The above summary will be described in more detail below with reference to the drawings. The invention is capable of embodiments in addition to those described and of being practiced and carried out in various ways. It is thus to be understood that the invention is not limited in its application to the details of construction and to the arrangements of the components set forth in the following description or illustrated in the drawings. Also, it is to be understood that the phraseology and terminology employed herein, as well as the abstract, are for the purpose of description and should not be regarded as limiting.

As such, those skilled in the art will appreciate that the present invention may readily be utilized as a basis for the designing of other structures, methods and systems for carrying out the several purposes of the present invention. It is important, therefore, that the claims appended hereto be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 3 exemplarily depicts an object and disassembled components of the object;

DETAILED DESCRIPTION

Figure 1:
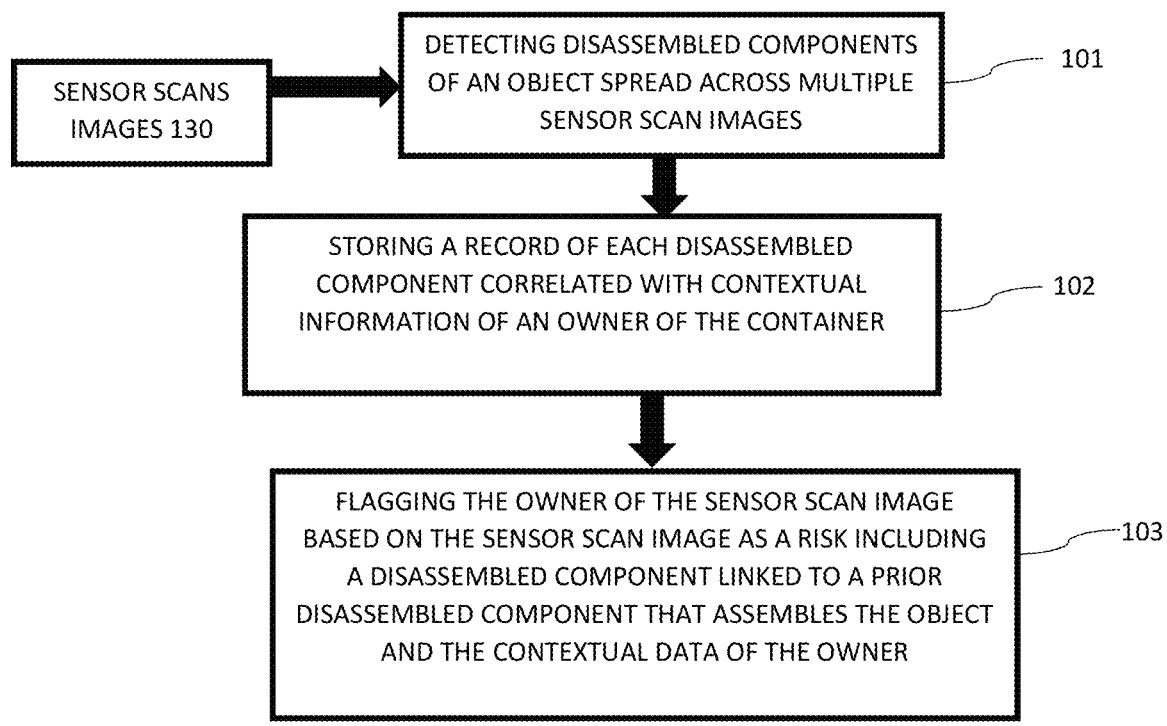
FIG. 1 depicts a high-level flow chart for a computer-implemented luggage screening method, according to an embodiment of the present invention.

The invention will now be described with reference to FIGS. 1-6, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, a luggage screening method 100 according to an embodiment of the present invention includes various steps for automatically detecting the disassembled components from potentially hazardous objects and finding a correlation between the objects across multiple bags/passengers/scans temporally and spatially distant (i.e., at different times and at different locations). Moreover, the luggage screening method 100 includes various steps for utilizing a self-adjusted memory personalized to a given end-user to remember and delete information from all relevant scanning.

Figure 2:
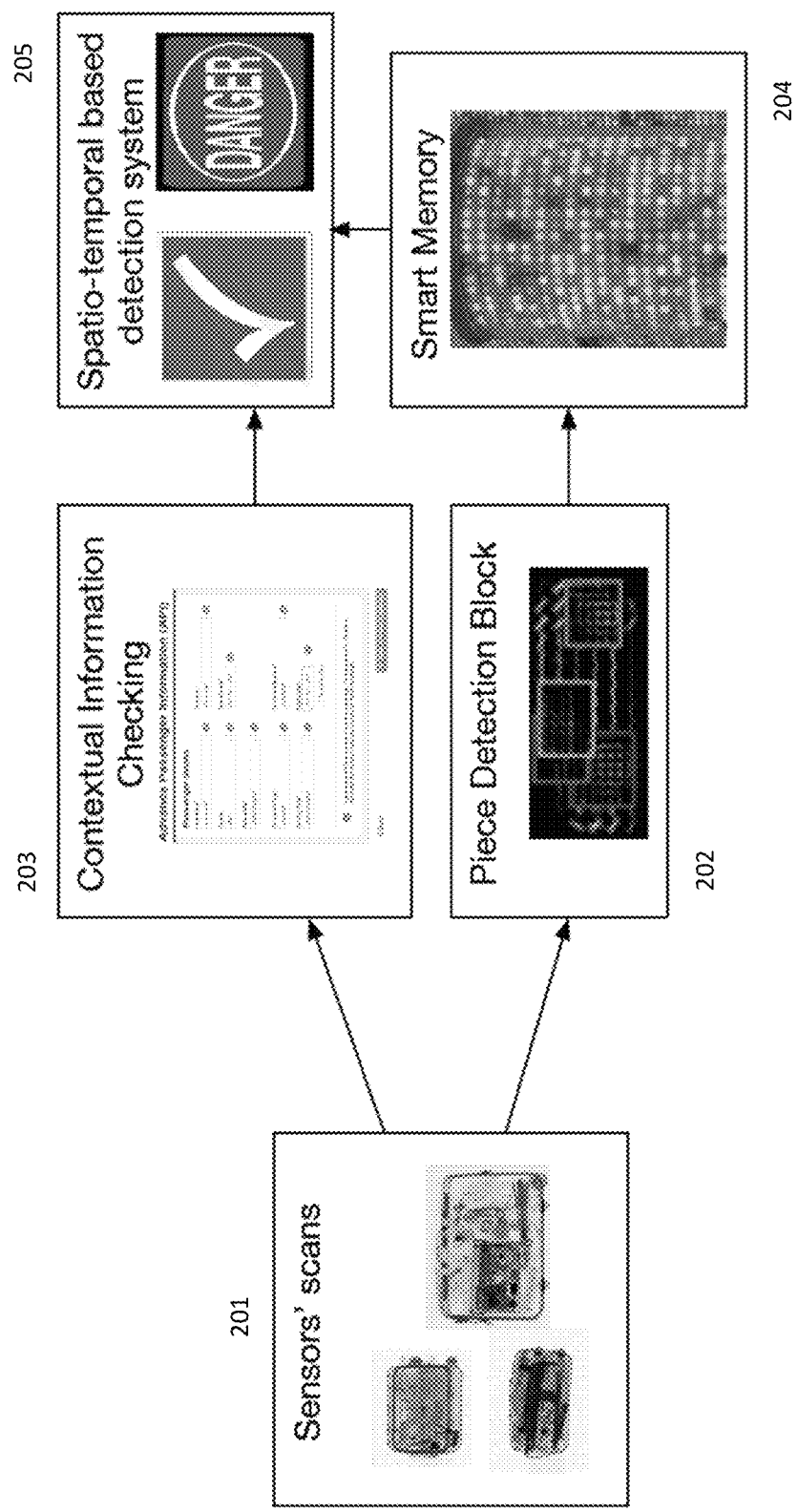
FIG. 2 exemplarily depicts a process flow of the luggage screening method.

Referring generally to FIGS. 1-3, in step 101, sensor scan images 130 (i.e., security check point scans of luggage, individuals, containers, etc. 201) are processed to detect if a disassembled component of an object is present in the sensor scan image. That is, multiple sensor scan images 130 from multiple sensors spatially and/or temporally disparate are recorded. The images are processed to detect if any component of an object (e.g., a dangerous/hazardous object) is present in the image. In one embodiment, a computer vision technique, such as, Deformable Parts Model (DPM) 202 can be used to detect a disassembled component(s) of an object. It is noted that the object may be related to a dangerous/hazardous object but each end-user can specify the types of objects of which the components are to be checked. For example, in one embodiment, a dangerous weapon can include several components and when any of the components are detected, the user can be flagged (as described later). However, the object does not need to be a dangerous object. In another embodiment, a corporation with proprietary information can be concerned about objects leaving their headquarters (e.g., confidential papers, memory chip, components, etc.) and search for memory chip components or the like disassembled that can store data.

In step 102, a record of each disassembled component is stored in a database and correlated with contextual information of the sensor scan image including the disassembled component. Preferably, an image of the component is similarly stored. Contextual information can include, for example, information about the owner of the luggage of which the sensor scan image was taken and their corresponding information such as travel destination (i.e., a departure and arrival airport and/or countries), a travel time (flight time, train departure, etc.), a check-in time, a number of days that the travel time is booked in advance, a method of payment, a type of travel plan (i.e., one-way or round-trip), a transportation company, whether the travel is booked with a companion, a passport country, whether the person if on a watch list, a place of birth, citizenship, a travel frequency, etc. That is, the contextual information includes a profile of the owner of the luggage with the detected disassembled component of an object. The smart memory/database 204 can be filtered according to an end user requirements. For example, a short-term memory can be utilized (e.g., 2 months) and only detected potential dangerous components within those two months are stored for later decision making. The database is preferably a shared database for cross-checking across potential multiple locations (i.e., spatially disparate). For example, a database can be accessibly across multiple airports security systems such that an individual traveling with a first component from Europe to the United States can be checked against a traveler having a second component of the object traveling from Canada to the United States (either to the same airport or different airports) at a different time.

In step 103, an owner of the luggage corresponding to the sensor scan image is flagged based on the sensor scan image including a disassembled component linked to a prior disassembled component of an object and the contextual data of the owner. For example, with reference to FIG. 3, an object 301 can include a first component 301a, a second component 301b, and a third component 301c. If the first component 301a was detected in a sensor image scan, and at a later time, either the second component 301b or third component 301c is detected in a sensor image scan, the owner of the luggage corresponding to the sensor image scan including the additional component 301b/c is flagged for further checking. Preferably, the method outputs a "flag" of which an operator further reviews the information to determine a threat level of the component. However, the flagging can be automatic and preclude allowing the luggage through the checkpoint.

Also, the flagging can include a joint assessment weighing the contextual information of the owner of the component and a link to the owner of the prior disassembled component and the likelihood of assembly. For example, a woman traveler brings lots of heavy metal-based equipment is very rare, and thus, upon detection thereof, an open luggage checking and warning instruction is sent to the security gate. The first component of an object found in luggage number 1 belonged to passenger number 1, and the second component found in luggage number 2 belong to passenger number 2. Passenger number 2 is flagged at the security checkpoint for further review. However, passenger number 2 may not be flagged if, for example, there is an amount of correlation between the contextual information of the two passengers below a threshold value. The method can include a rule-based decision tree in which a threshold of association of contextual information jointly combined with the assembly of the components will result in a flag. In this manner, unnecessary flags can be prevented.

In another exemplary embodiment, persons A, B and C are under watch (based on contextual information) and are boarding three different flights (e.g., one from Riyadh, one from Minneapolis, and one from Paris) to the same destination (e.g., New York) The method has detected that they are carrying parts that can be assembled as an object. This strong correlation between owners of luggage including a component can lead to a flagging of the passengers. Also, as another example, person A and B have arrived at a port of entry from separate source. Each of them is carrying a chemical that is not hazardous on its own—but when mixed together, the mixture can be lethal. However, there is no contextual information linking the two persons. But, since the combination poses a great threat, the presence alone of the two materials is greater than the threshold such that the passengers are flagged even with no contextual information correlated with each other. Alternatively, if the threat of combination results in a low threat object, and there is little contextual information correlated between the owners of the luggage including the components, flagging can be skipped to avoid travel delays. Thus, a scoring based on a sliding scale can be performed relatively balancing the degree of the threat with the amount of contextual information linking the passengers.

Moreover, in step 103, a spatio-temporal based detection technique 205 can be utilized. Relevant personal information from a single or multiple passengers to match their belongings. For instance, a woman traveler brings lots of heavy metal-based equipment is very rare, an open luggage checking and warning instruction is sent to the security gate.

The first weapon piece found in luggage no. 1 belonged to passenger no. 1, and the second weapon piece found in luggage no. 2 belong to passenger no. 2, the system will relate those two piece together and give a warning. It is noted that the disassembled component may be brought in by the same person in the same container but on different trips, or by multiple persons on the same or different trips, in different containers.

A luggage screening method 100 according to some embodiments of the present invention may act in a more sophisticated and useful fashion, and in a cognitive manner while giving the impression of cognitive mental abilities and processes related to knowledge, attention, memory, judgment and evaluation, reasoning, and advanced computation. For example, a system/method may be considered "cognitive" if it possesses macro-scale properties—perception, goal-oriented behavior, learning/memory and action—that characterize systems (i.e., humans) that are generally agreed as cognitive.

Figure 4:
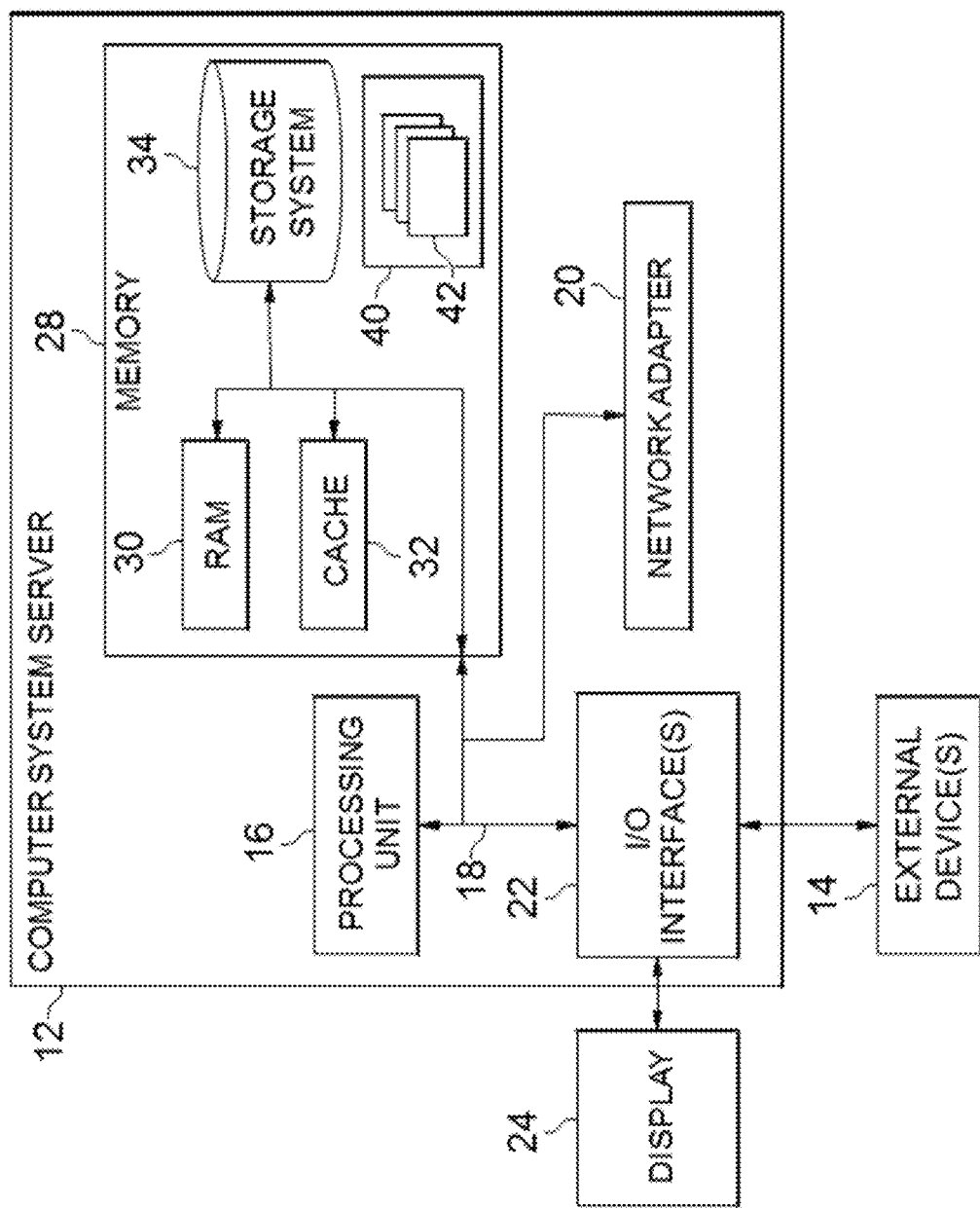
FIG. 4 depicts a cloud computing node according to an embodiment of the present invention.

Referring also now to FIG. 4, one or more computers of a computer system 12 according to an embodiment of the present invention can include a memory 28 having instructions stored in a storage system to perform the steps of FIG. 1.

As will described/illustrated in more detail below, one or more embodiments of the present invention may be implemented in a cloud environment (see e.g., FIGS. 4-6). It is nonetheless understood that the present invention can be implemented outside of the cloud environment.

Exemplary Hardware Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 4 depicts a an example of a computing node in accordance with the present invention. Although computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer server 12 is only one example of a suitable computing node and is not intended to suggest any limitation as to the scope of use or functionality of embodiments of the invention described herein. Regardless, computer server 12 is capable of being implemented and/or performing any of the functionality set forth herein.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in cloud computing environments (see e.g., FIG. 3) where tasks are performed by remote processing circuits that are linked through a communications network. In a distributed cloud computing environment, program modules may be located in both local and remote computer system storage media including memory storage circuits.

Referring again to FIG. 4, computer system/server 12 is shown in the form of a general-purpose computing circuit. The components of computer system/server 12 may include, but are not limited to, one or more processors or processing units 16, a system memory 28, and a bus 18 that operably couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. In some embodiments, program modules 42 generally carry out the functions and/or methodologies of embodiments of the invention as described herein.

Computer system/server 12 may also communicate with one or more external devices 14 such as a keyboard, a pointing circuit, a display 24, a camera, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 5:
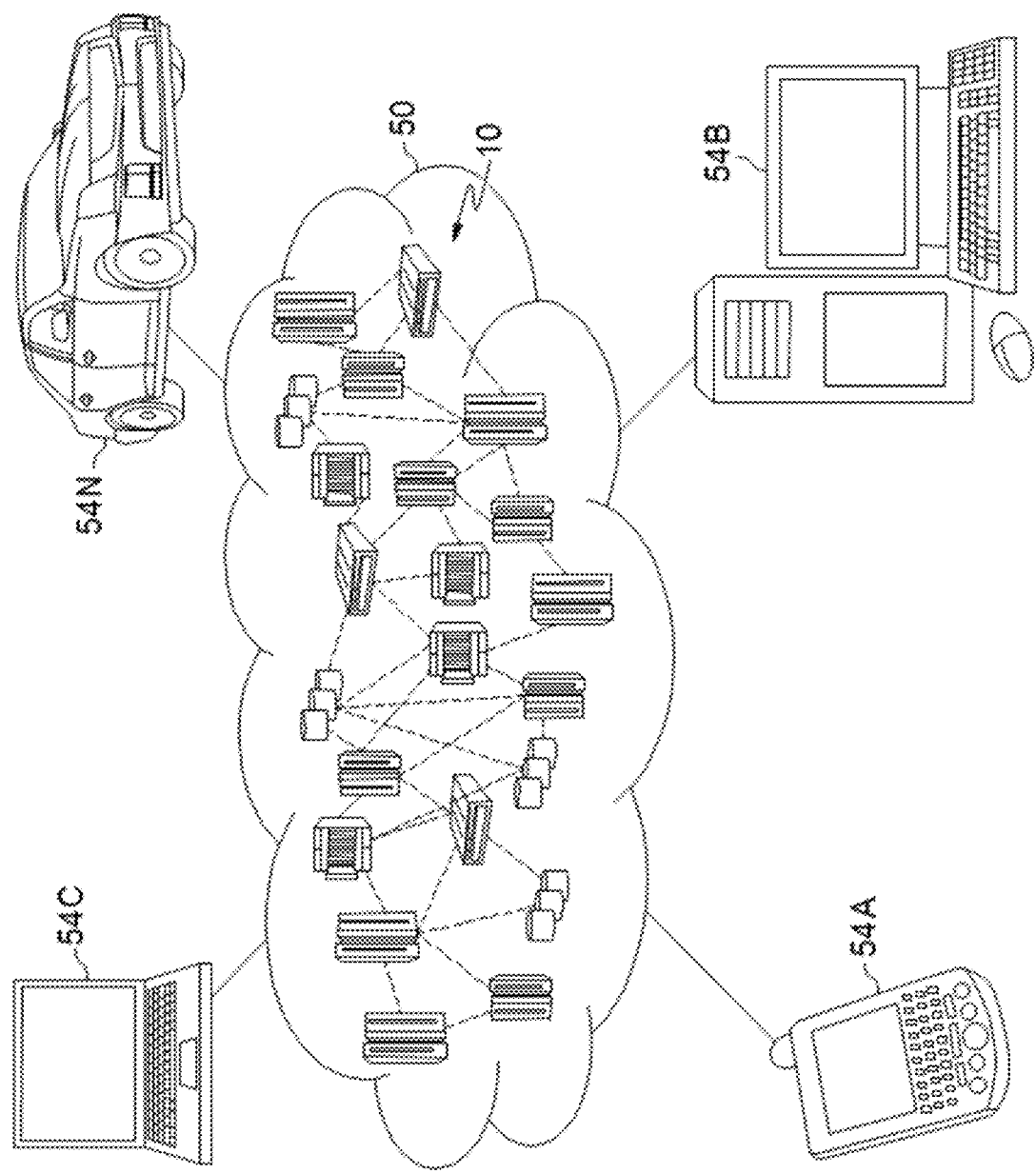
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 (e.g., computer system 12 (FIG. 3) with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 5 are intended to be illustrative only and that computing nodes 10 and cloud computing environment 50 can communicate with any type of computerized circuit over any type of network and/or network addressable connection (e.g., using a web browser).

Figure 6:
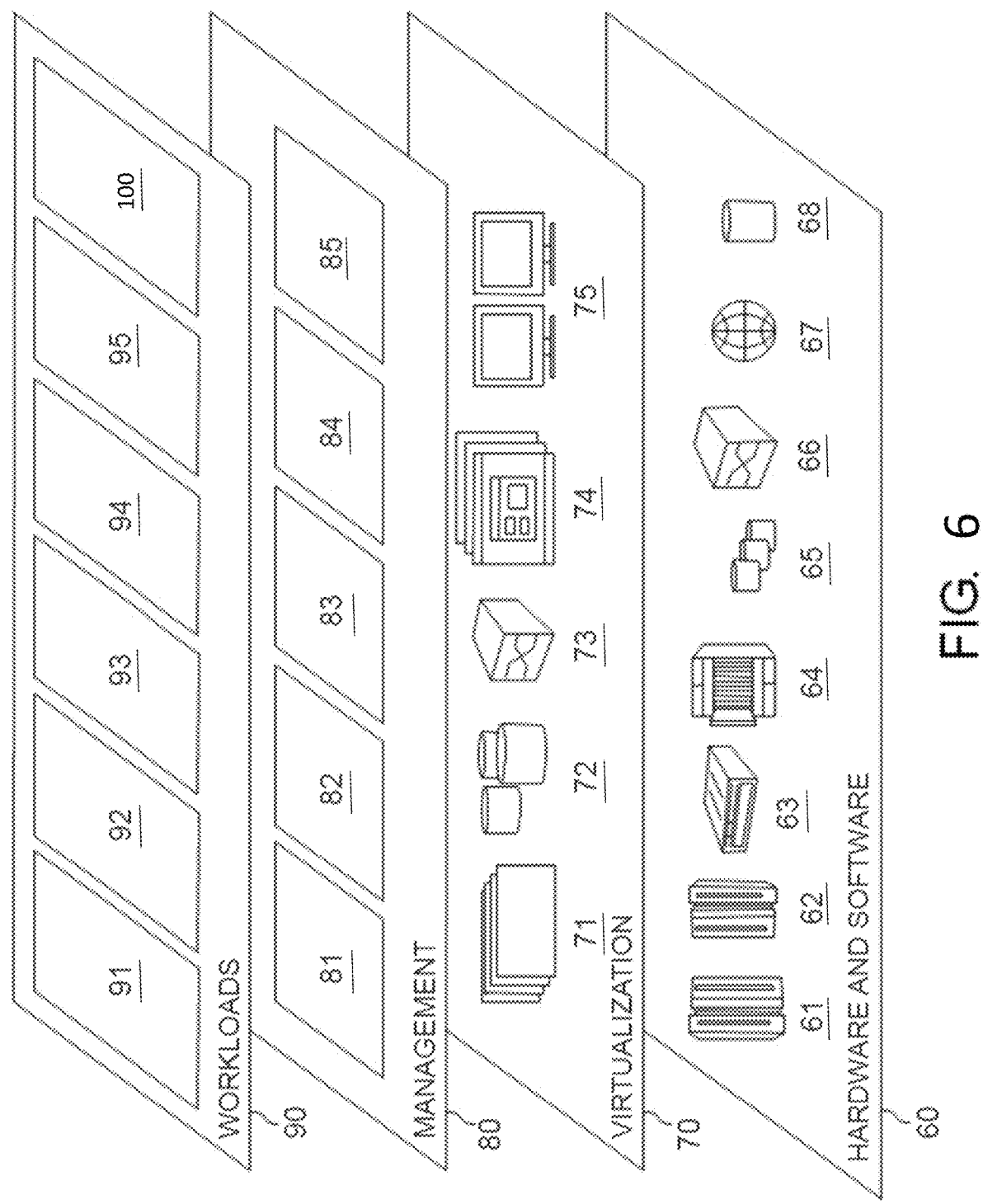
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the luggage screening method 100.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented screening method, the method comprising:
    detecting a disassembled component of an object in a first sensor scan image of a first container belonging to a first owner and another disassembled component of the object in a second sensor scan image of a second container belonging to a second owner, the first sensor scan image being linked to the first owner and the second sensor scan image being linked to the second owner, the detecting being based on a trained model that is run both offline and online;
    storing a record of the disassembled component correlated with contextual information of the first owner, and storing a record of the another disassembled component correlated with contextual information of the second owner, the contextual information comprising a departure location and a destination location of the respective owners;
    determining that the disassembled component can be combined with the another disassembled component to assemble the object;
    determining a degree of danger posed by assembly of the object;
    determining a correlation between the first owner and the second owner based on the contextual information of the respective owners and a past relationship between the first owner and the second owner, the correlation indicating a likelihood of assembly of the object; and
    determining whether to flag the first owner and the second owner based on an assessment of the degree of danger and the correlation, wherein the determining whether to flag comprises:
        when the correlation is greater than a linking threshold, flagging the first owner and the second owner;
        when the correlation is less than the linking threshold and the degree of danger is less than a threat threshold, no flagging is performed; and
        when the correlation is less than the linking threshold and the degree of danger is greater than the threat threshold, flagging the first owner and the second owner.

2. The computer-implemented method of claim 1, wherein the sensor scan images comprise sensor scan images that are at least one of spatially and temporally disparate, and
    wherein the detecting uses a Deformable Parts Model technique for a detection technique.

3. The computer-implement method of claim 1, wherein the storing stores the record of each disassembled component in a configurable database that is configured based on a time period of relevant sensor scan images.

4. The computer-implement method of claim 1, wherein the flagging flags the disassembled component irrespective of a prior sensor scan image including the another disassembled component if a threat of the object is greater than a predetermined threshold.

5. The method of claim 1, embodied in a cloud-computing environment.

6. A computer program product, the computer program product comprising a non-transitory computer-readable storage medium having program instructions embodied therewith, the program instructions executable by a computer to cause the computer to perform:
    detecting a disassembled component of an object in a first sensor scan image of a first container belonging to a first owner and another disassembled component of the object in a second sensor scan image of a second container belonging to a second owner, the first sensor scan image being linked to the first owner and the second sensor scan image being linked to the second owner, the detecting being based on a trained model that is run both offline and online;
    storing a record of the disassembled component correlated with contextual information of the first owner, and storing a record of the another disassembled component correlated with contextual information of the second owner, the contextual information comprising a departure location and a destination location of the respective owners;
    determining that the disassembled component can be combined with the another disassembled component to assemble the object;
    determining a degree of danger posed by assembly of the object;
    determining a correlation between the first owner and the second owner based on the contextual information of the respective owners and a past relationship between the first owner and the second owner, the correlation indicating a likelihood of assembly of the object; and
    determining whether to flag the first owner and the second owner based on an assessment of the degree of danger and the correlation, wherein the determining whether to flag comprises:
        when the correlation is greater than a linking threshold, flagging the first owner and the second owner;
        when the correlation is less than the linking threshold and the degree of danger is less than a threat threshold, no flagging is performed; and
        when the correlation is less than the linking threshold and the degree of danger is greater than the threat threshold, flagging the first owner and the second owner.

7. The computer program product of claim 6, wherein the storing stores the record of each disassembled component in a configurable database that is configured based on a time period of relevant sensor scan images.

8. The computer program product of claim 6, wherein the flagging flags the disassembled component irrespective of a prior sensor scan image including the another disassembled component if a threat of the object is greater than a predetermined threshold.

9. A prediction system, the system comprising:
    a processor; and
    a memory operably coupled to the processor, the memory storing instructions to cause the processor to perform:
        detecting a disassembled component of an object in a first sensor scan image of a first container belonging to a first owner and another disassembled component of the object in a second sensor scan image of a second container belonging to a second owner, the first sensor scan image being linked to the first owner and the second sensor scan image being linked to the second owner, the detecting being based on a trained model that is run both offline and online;

storing a record of the disassembled component correlated with contextual information of the first owner, and storing a record of the another disassembled component correlated with contextual information of the second owner, the contextual information comprising a departure location and a destination location of the respective owners;

determining that the disassembled component can be combined with the another disassembled component to assemble the object;

determining a degree of danger posed by assembly of the object;

determining a correlation between the first owner and the second owner based on the contextual information of the respective owners and a past relationship between the first owner and the second owner, the correlation indicating a likelihood of assembly of the object; and determining whether to flag the first owner and the second owner based on an assessment of the degree of danger and the correlation, wherein the determining whether to flag comprises:

when the correlation is greater than a linking threshold, flagging the first owner and the second owner;

when the correlation is less than the linking threshold and the degree of danger is less than a threat threshold, no flagging is performed; and when the correlation is less than the linking threshold and the degree of danger is greater than the threat threshold, flagging the first owner and the second owner.

10. The system of claim 9, embodied in a cloud-computing environment.

* * * * *